(12) United States Patent
Paik et al.

(10) Patent No.: US 9,419,313 B2
(45) Date of Patent: Aug. 16, 2016

(54) LITHIUM BATTERY WITH REFERENCE ELECTRODE PLATED ON AN INTERIOR SURFACE OF A NEUTRAL METAL CAN

(71) Applicant: Ford Global Technologies, LLC, Dearborn, MI (US)

(72) Inventors: Chi Paik, Brownstown Township, MI (US); Feng Li, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 14/057,635

(22) Filed: Oct. 18, 2013

(65) Prior Publication Data

US 2015/0111077 A1    Apr. 23, 2015

(51) Int. Cl.

| | |
|---|---|
| H01M 10/48 | (2006.01) |
| H01M 10/0525 | (2010.01) |
| C25D 7/04 | (2006.01) |
| H01M 2/02 | (2006.01) |
| H01M 10/052 | (2010.01) |
| H01M 6/50 | (2006.01) |
| C25D 21/12 | (2006.01) |

(52) U.S. Cl.
CPC .................. *H01M 10/48* (2013.01); *C25D 7/04* (2013.01); *H01M 2/0285* (2013.01); *H01M 6/5005* (2013.01); *H01M 10/052* (2013.01); *H01M 10/0525* (2013.01); *C25D 21/12* (2013.01); *Y02E 60/122* (2013.01); *Y02T 10/7011* (2013.01)

(58) Field of Classification Search
CPC ..... H01M 10/0525; H01M 10/48; C25D 7/04
See application file for complete search history.

(56) References Cited

U.S. PATENT DOCUMENTS

| | | | |
|---|---|---|---|
| 5,213,668 A * | 5/1993 | Zboril | 205/787.5 |
| 5,954,930 A | 9/1999 | Nafe et al. | |
| 6,699,623 B1 | 3/2004 | Dai | |
| 2009/0104510 A1* | 4/2009 | Fulop et al. | 429/50 |
| 2010/0176001 A1* | 7/2010 | Tsai et al. | 205/74 |
| 2011/0250478 A1 | 10/2011 | Timmons et al. | |
| 2012/0043301 A1* | 2/2012 | Arvin et al. | 216/86 |
| 2012/0177959 A1* | 7/2012 | Zhong et al. | 429/53 |
| 2012/0263986 A1 | 10/2012 | Fulop et al. | |

OTHER PUBLICATIONS

Anonymous, "A high-power Lithium-air battery based on a non-planar cell configuration.," IPCOM No. 000234665, Published Jan. 27, 2014, 3 pages.

* cited by examiner

*Primary Examiner* — Kenneth Douyette
(74) *Attorney, Agent, or Firm* — David Kelley; Alleman Hall McCoy Russell & Tuttle LLP (57) ABSTRACT

A method of manufacturing a reference electrode for a lithium ion battery comprises charging the battery to a threshold state-of-charge, wherein the battery includes a neutral metal can and a negative electrode, and plating a reference electrode on an interior surface of the neutral metal can by electrically connecting the neutral metal can to the negative electrode, a neutral metal can potential being greater than a negative electrode potential.

13 Claims, 10 Drawing Sheets

LITHIUM BATTERY WITH REFERENCE ELECTRODE PLATED ON AN INTERIOR SURFACE OF A NEUTRAL METAL CAN

BACKGROUND AND SUMMARY

Commercial two-electrode lithium ion batteries for supplying power to electric and hybrid vehicles are commonly adapted to enable monitoring of battery state-of-health (SOH) and/or state-of-charge (SOC) by installing various sensors at the battery. However, in two-electrode systems, only relative measurements between the working electrodes can be determined. Three-electrode lithium ion batteries, which incorporate a reference electrode into the battery, can provide a more accurate assessment of battery state-of-health and/or battery-state-of-charge since absolute measurements of each working electrode can be obtained. Reference electrodes are either installed during manufacture of a new battery, or existing two-electrode batteries may be retrofitted with a reference electrode.

For example, Fulop (US 2012/0263986) discloses a lithium rechargeable cell with reference electrode for SOH monitoring, wherein a reference electrode comprises active material deposited on a metal current collector, or mixed as particulate with binder and a conductive additive and then coated on a metal foil. The reference electrode may be electronically connected to the can. Furthermore, in cases where the can is aluminum, copper, stainless steel, or titanium, the can is capable of serving as the reference electrode, wherein the interior wall surface of the can is coated with protective insulating material to provide electronic insulation of the can from the working electrodes.

The inventors herein have recognized potential issues with the above approaches. Namely, conventional methods of installing reference electrodes during manufacture of new batteries can be costly and complex, since an additional battery port must be added and properly sealed to accommodate the reference electrode. Furthermore, addition of the reference electrode may reduce the battery capacity for a given size since the reference electrode, and associated seal, port, separator, etc. consume volume that may be otherwise used for active battery material. Further still, conventional methods of retrofitting two-electrode batteries with a reference electrode involve breaching the sealed can of the battery, which can be costly and can often damage the battery components, leading to premature battery failure. Further still, the aluminum, titanium, copper, or stainless steel can reference electrodes of Fulop are not stable non-polarizable reference electrodes that can accurately measure absolute potentials of each working electrode. Further still, mixing particulate with binder and a conductive additive and then coating the mixture on a metal foil is a complicated multistep, multicomponent method of forming a reference electrode that reduces manufacturing efficiency and increases manufacturing costs.

One approach that at least partially overcomes the above issues and achieves the technical result of manufacturing a reference electrode in an existing sealed battery is a method of manufacturing a reference electrode for a lithium ion battery, comprising charging the battery to a threshold state-of-charge, where the battery includes a neutral metal can and a negative electrode, and plating a reference electrode on an interior surface of the can by electrically connecting the neutral metal can to the negative electrode, wherein a neutral metal can potential is greater than a negative electrode potential. In this way, it is possible to retrofit existing two-electrode batteries to form the reference electrode without breaching the seal of the battery, and to manufacture reference electrode for lithium ion batteries in a more cost-effective and less complex manner, as compared with conventional methods. Furthermore, a stable, non-polarizable reference electrode can be provided for accurately monitoring SOH over the life of the battery.

In another embodiment, a lithium ion battery comprises a neutral metal can, and a reference electrode electroplated on an interior surface of the neutral metal can. In another embodiment, a vehicle battery management system comprises a lithium ion battery including a neutral metal can and a reference electrode electroplated on an interior surface of the neutral metal can, and a controller with executable instructions to determine a state-of-health of a battery by measuring a potential difference between the reference electrode and a negative electrode, and measuring a potential difference between the reference electrode and a negative electrode.

In another embodiment, the reference electrode may be manufactured by connecting the neutral metal can and an electrode of the lithium ion battery with an electrical power source, and directing current from the electrical power source to the neutral metal can.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

DETAILED DESCRIPTION

Figure 1:
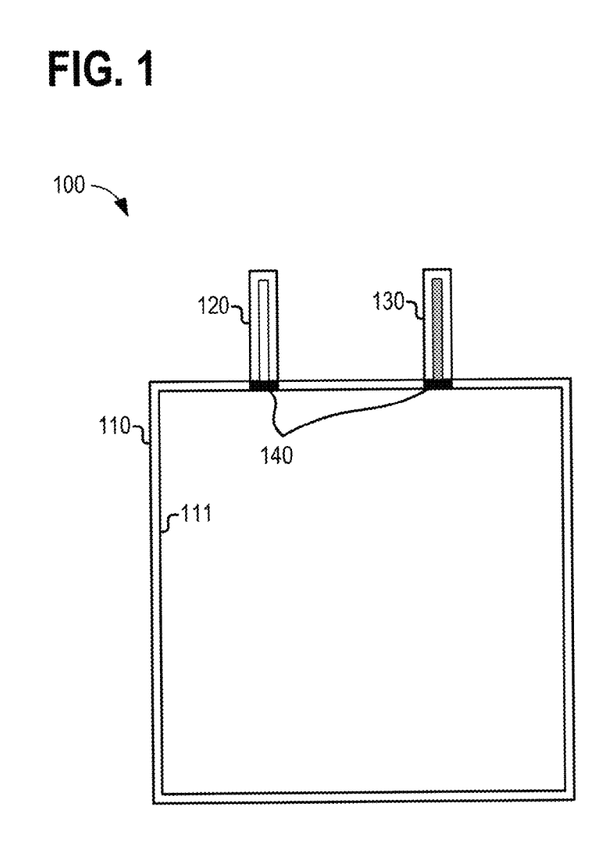
FIG. 1 shows a schematic of an example lithium ion battery.
Figure 2:
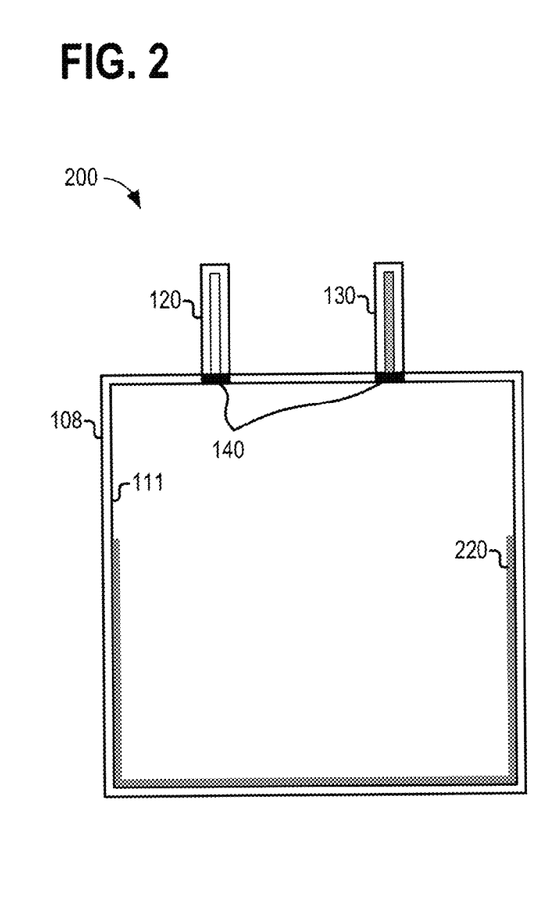
FIG. 2 shows a schematic of an example lithium ion battery retrofitted with a reference electrode.
Figure 3:
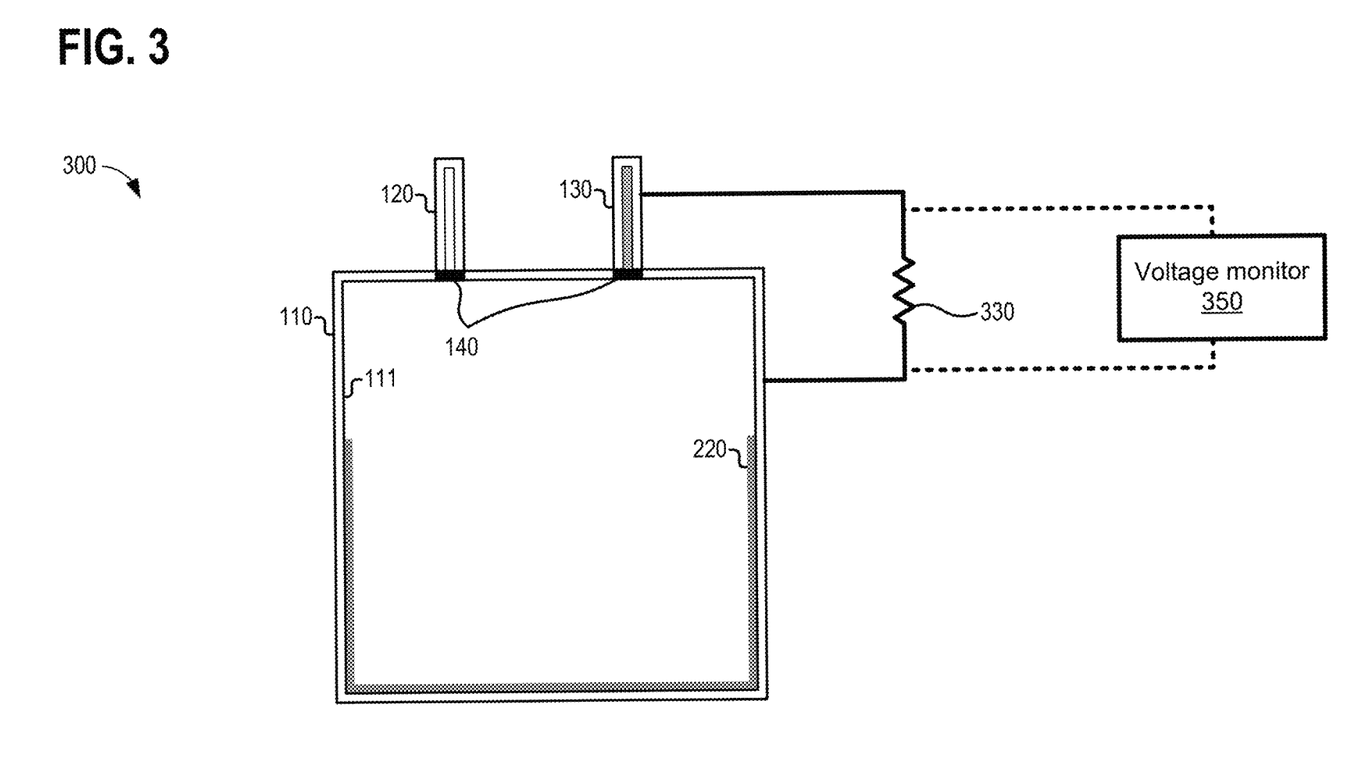
FIG. 3 shows a schematic of an example apparatus for manufacturing a reference electrode.
Figure 4:
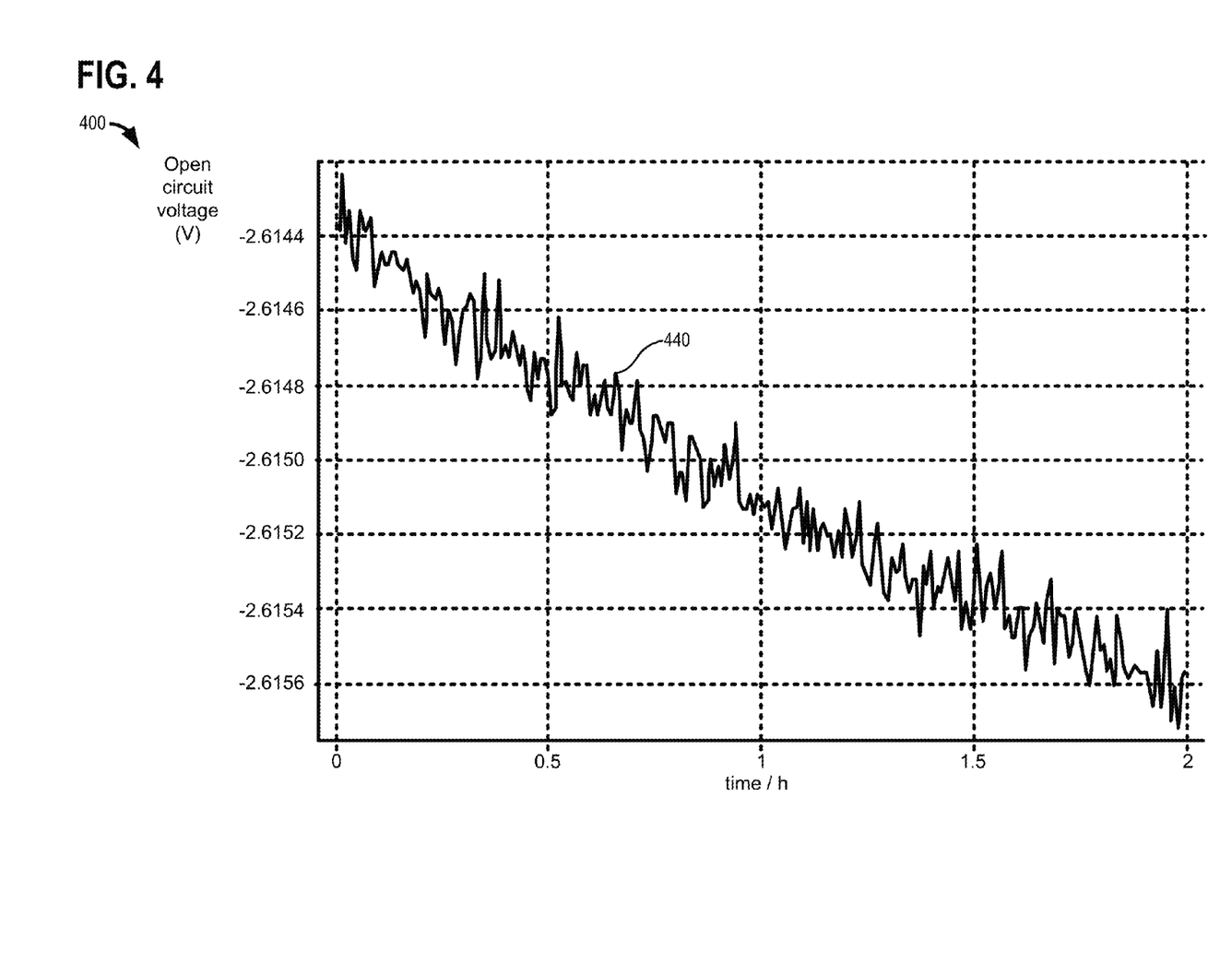
FIG. 4 shows a plot of the open circuit voltage vs. time of a battery with an aluminum can reference electrode.
Figure 5:
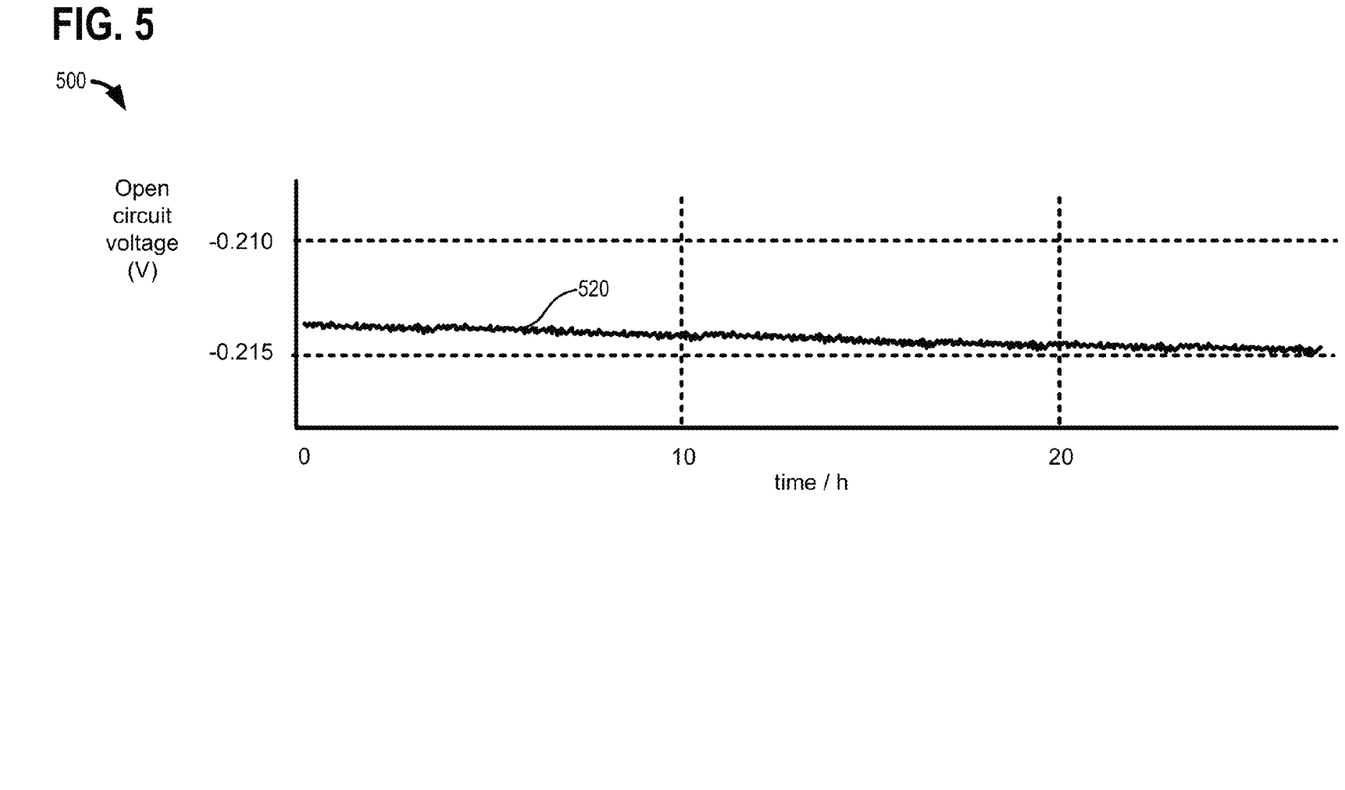
FIG. 5 shows a plot of the open circuit voltage vs. time of a battery with a lithium-plated aluminum can reference electrode.
Figure 6:
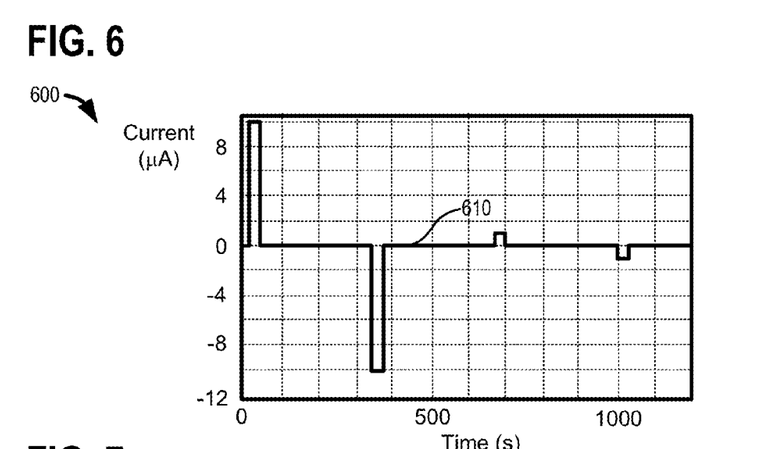
FIGS. 6-8 show plots illustrating a reference electrode polarization test.
Figure 7:
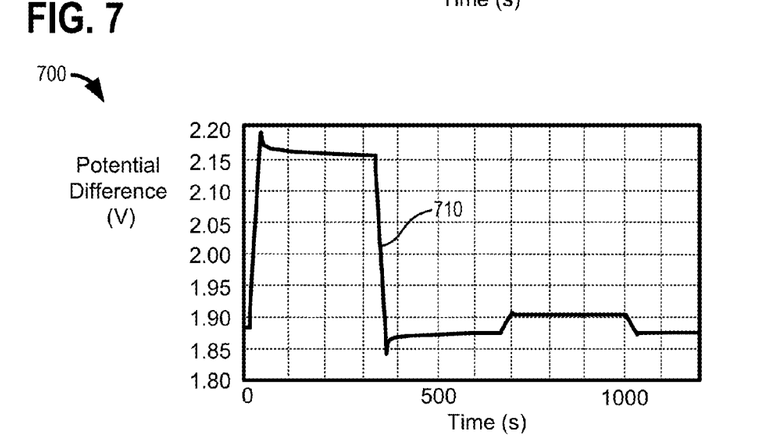
Figure 8:
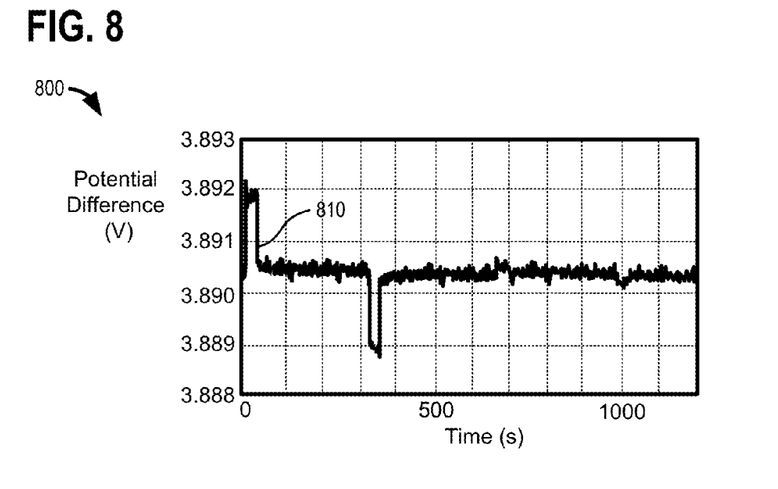
Figure 9:
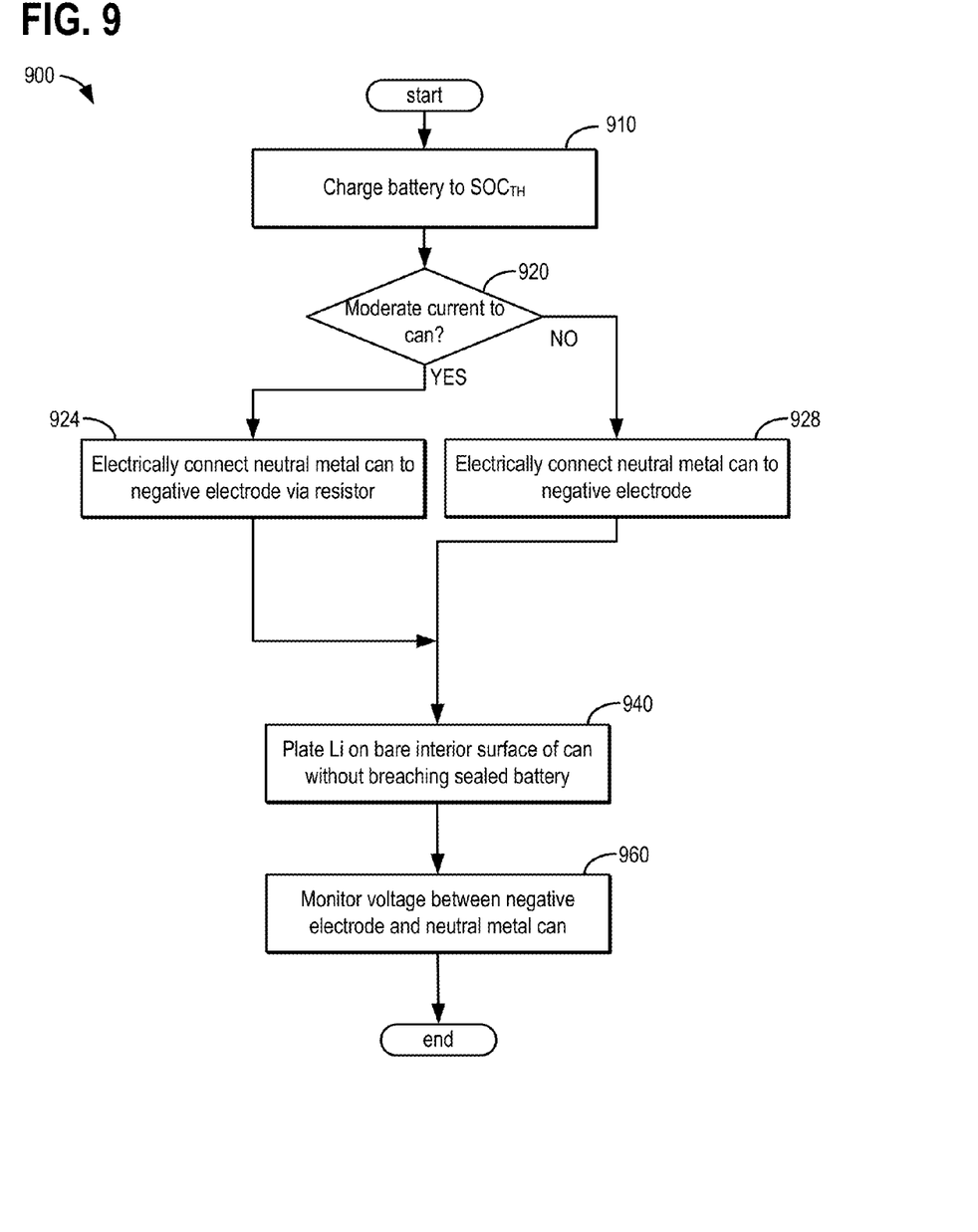
FIG. 9 is a flow chart for a method of manufacturing a reference electrode.
Figure 10:
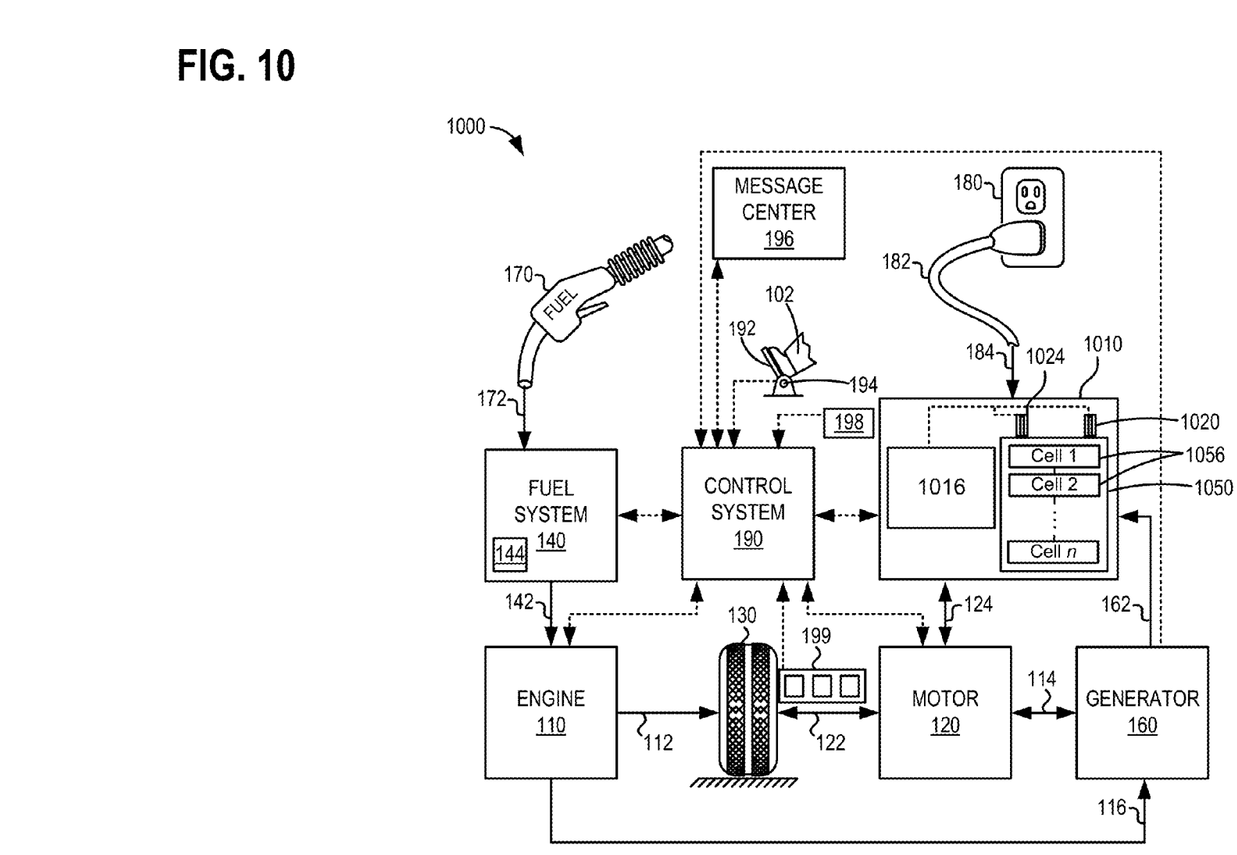
FIG. 10 shows a vehicle propulsion system including a battery management system comprising a battery with a reference electrode manufactured according to the method of FIG. 9.
Figure 11:
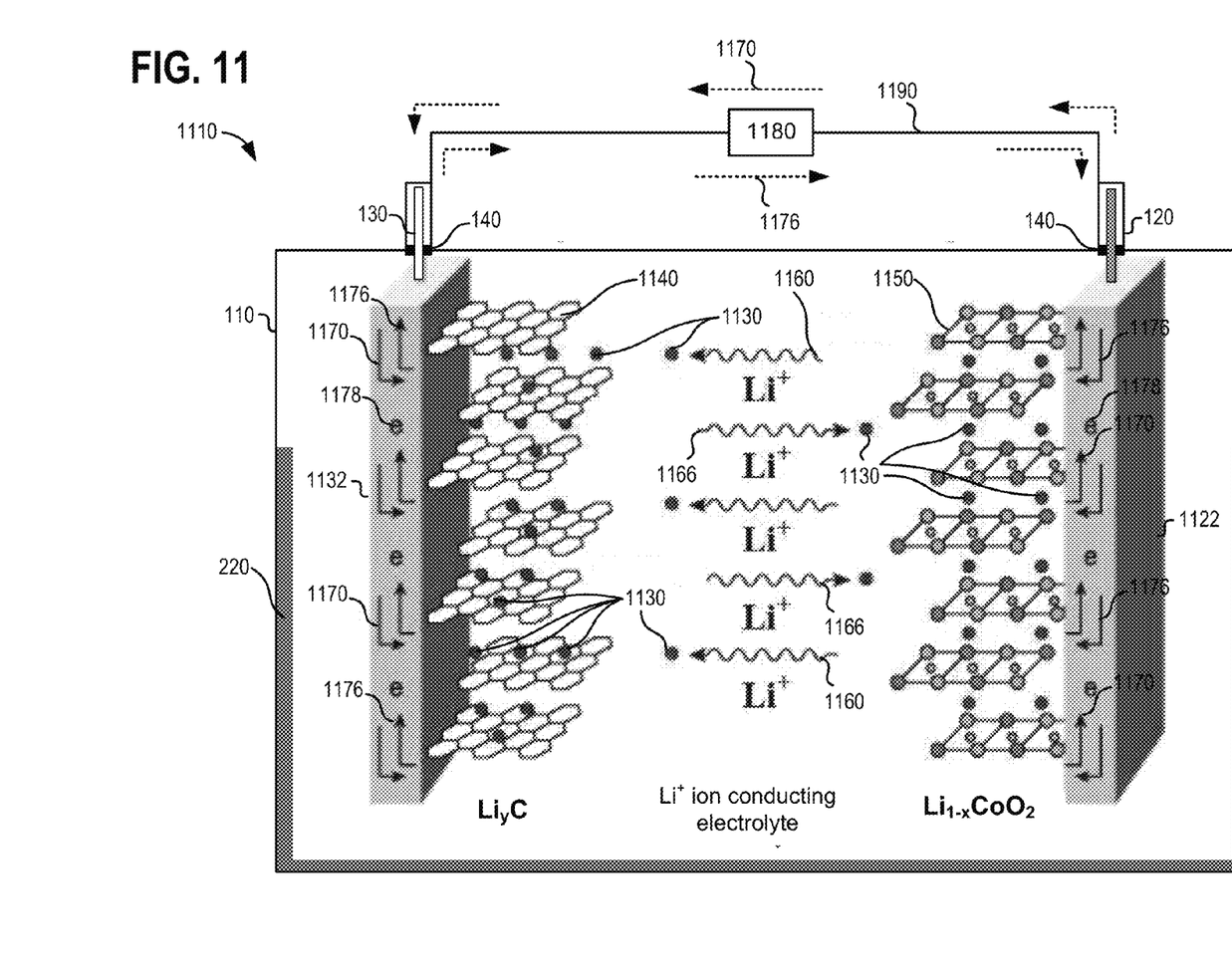
FIG. 11 shows a schematic illustrating operation of a lithium ion battery.
Figure 12:
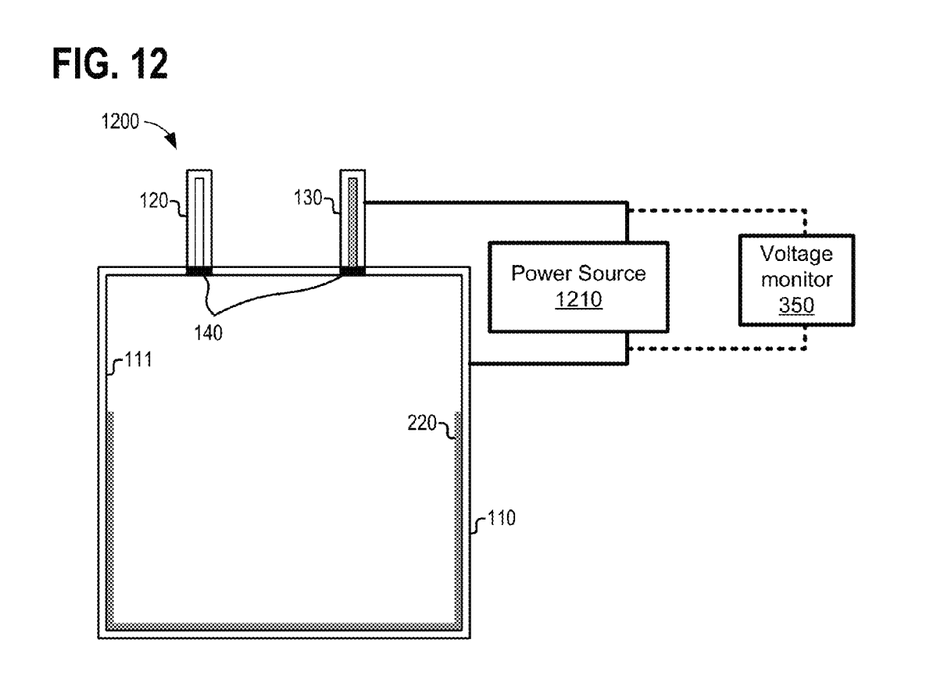
FIGS. 12-13 illustrate an example apparatus for manufacturing a reference electrode.
Figure 13:
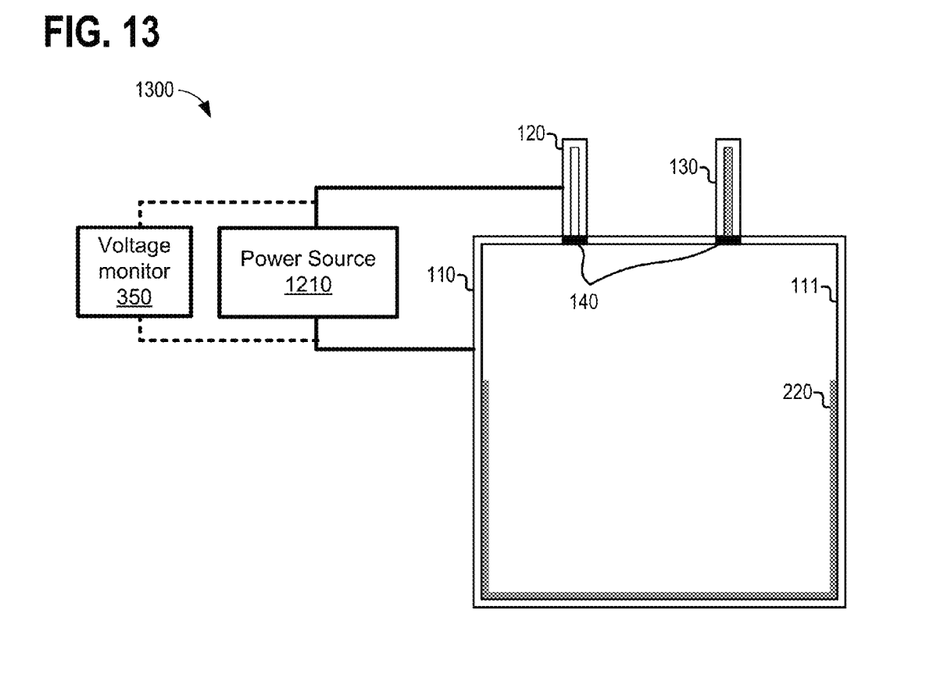
Figure 14:
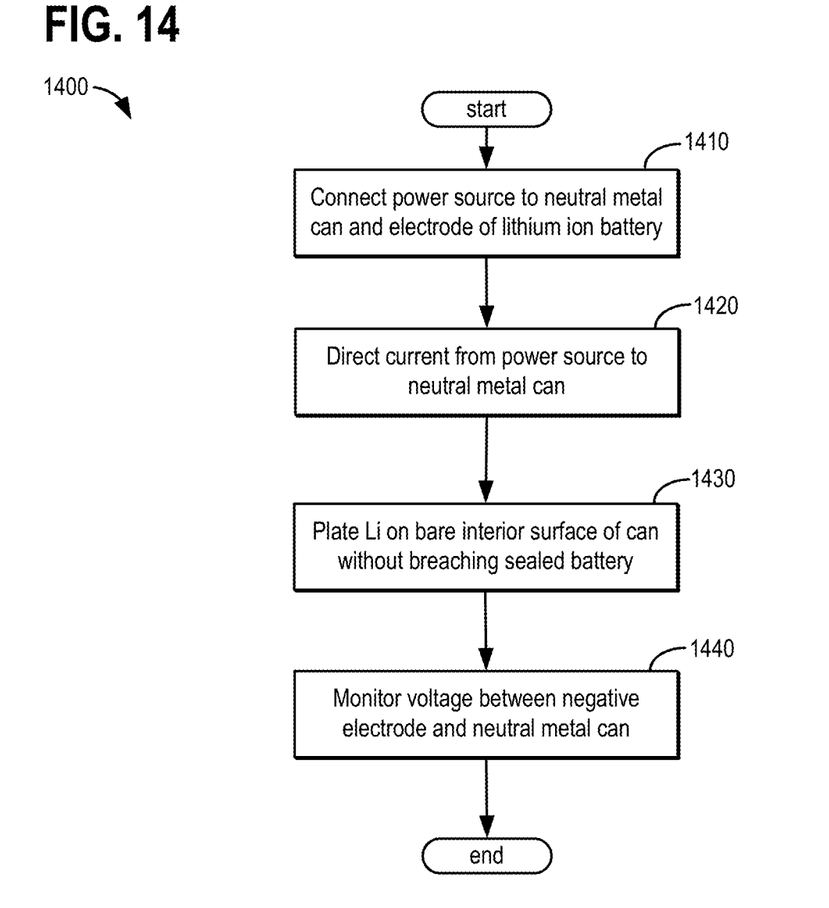
FIG. 14 illustrates an example method for manufacturing a reference electrode.

The description relates to a method for manufacturing a reference electrode for a lithium ion battery, such as for a hybrid electric or electric vehicle. FIG. 1 shows an example of a two-electrode lithium ion battery with no reference electrode, and FIG. 2 schematically illustrates the lithium ion battery of FIG. 1 after forming the reference electrode. FIG. 3 illustrates an example apparatus for forming a reference electrode shown in FIG. 2. FIG. 4 shows a chart illustrating open circuit voltage stability of a neutral aluminum can reference electrode, and FIG. 5 shows the open circuit voltage stability of the reference electrode embodiment shown in FIG. 2. FIGS. 6-8 illustrate polarization and stability test results for the reference electrode embodied in FIG. 2. FIG. 9 illustrates a flow chart for an example method for manufacturing the reference electrode embodied in FIG. 2, and FIG. 10 illustrates a vehicle propulsion system comprising a battery management system including a battery with a reference electrode. FIG. 11 schematically illustrates operation of a lithium ion battery. FIGS. 12-13 illustrate apparatus for another embodiment for manufacturing a reference electrode and FIG. 14 is a flow chart for the method of manufacturing a reference electrode embodied in FIGS. 12-13.

A reference electrode is a device that maintains a fixed value of its potential relative to the liquid electrolyte phase (e.g., potential-stable), and can thus be used for potentiometric measurements of an electrode system relative to the reference electrode. For example, a reference electrode can be used to obtain absolute measurements of each working electrode (e.g., positive electrode, and negative electrode) of a lithium ion battery. An ideal reference electrode is reversible and obeys the Nernst equation with respect to the electrolyte active species. Furthermore, a reference electrode potential is stable (e.g., potential-stable) over time and returns to its initial value after small currents are passed through the electrode (e.g., no hysteresis).

In lithium-based redox systems, a lithium metal electrode is known to have a stable reversible potential. Conventional lithium electrodes may comprise a lithium foil or metallic lithium attached to a copper wire or grid, or a steel sheet. When conventional lithium electrodes are inserted into lithium ion batteries, they can reduce the battery capacity by displacing volume. Furthermore, because lithium metal is easily explosive in air, conventional lithium metal electrodes are prepared in an inert environment.

By electroplating a lithium reference electrode on an interior surface of a lithium ion battery according to the present description, handling of lithium metal external to the battery is avoided, simplifying manufacturing. Furthermore, existing sealed two-electrode lithium ion batteries may be retrofitted with an electroplated lithium metal reference electrode on the interior surface of the cell can without breaching the seal of the battery. Further still, a small amount of lithium metal may be used to form the reference electrode, improving manufacturing efficiency while enabling enhanced battery performance monitoring capabilities. For example, a reference electrode may be used to monitor the voltage changes of the cathode and anode with respect to the reference electrode during battery charge and discharge. Furthermore, the reference electrode may be used to distinguish the cathode and anode contribution to the cell impedance. Further still, the reference electrode may aid in diagnosing the battery cell aging mechanism and root causes of cycling performance characteristics.

Turning now to FIG. 1, it illustrates a schematic of an example battery cell of a lithium ion battery 100, including a battery housing or case such as a neutral metal can 110 and two working electrodes 120 and 130. Working electrodes 120 and 130 may be referred to as positive electrode 120 and a negative electrode 130. Insulators 140 are positioned between the neutral metal can 110 and both the positive electrode 120 and the negative electrode 130 so that there is no electrical connection therebetween. The neutral metal can 110 may comprise aluminum, stainless steel, or nickel plated steel, and alloys thereof, and may comprise an interior surface 111.

Turning now to FIG. 11, it illustrates operation of a lithium ion battery 1100. Positive electrode 120 of a lithium ion battery may be connected to a positive electrode current collector 1122. The positive current collector 1122 and positive electrode 120 may comprise a metal oxide such as $LiMO_2$, wherein M may be Co, Ni, Mn, and the like. Other known positive electrode material may also be utilized. The positive electrode material may further have a layered crystalline structure 1150. The negative electrode may be electrically connected to a negative current collector 1132. The negative current collector 1132 and the negative electrode 130 material may comprise graphitic carbon having a graphitic layered structure 1140. A lithium-ion conducting electrolyte such as lithium hexafluorophosphate ($LiPF_6$) dissolved in a mixture of organic solvents (e.g., carbonates) acts as an ionic pathway within the battery between the positive and negative electrode material. The electrolyte may be formulated depending on the electrode materials used and battery operating conditions. The electrolyte may further comprise additives for mitigating overcharge and extending battery life. As shown in FIG. 11, the neutral metal can 110 is not electrically connected to either electrode.

During battery charge, voltage is applied to the battery via a load 1180 connected to both the positive electrode 120 and the negative electrode 130 via electrical connector 1190, thereby extracting $Li^+$ ions 1130 from the interstitial space between the layers of the positive electrode material by electrochemical oxidation and simultaneously conducting flow of current (e.g., electrons 1178) from the positive electrode to the negative electrode, as indicated by arrows 1170. The extracted $Li^+$ ions are conducted through the liquid electrolyte, as indicated by arrows 1160, and intercalated in the layers of the negative electrode material during electrochemical reduction of the graphitic carbon material.

The electrochemical reactions occurring in the battery due to $Li^+$ extraction and insertion at the negative and positive electrodes during battery charge are described by equations (1) and (2) below:

$$LiMO_2 \xrightarrow{charge} Li_{1-x}CoO_2 + xLi^+ + xe^- \quad (0 \le x \le 0.5) \quad (1)$$

$$6C + yLi^+ + ye^- \xrightarrow{charge} Li_yC_6 \quad (0 \le y \le 1) \quad (2)$$

Thus, the overall reaction during battery charge is represented by equation (3):

$$LiCoO_2 \xrightarrow{charge} Li_yC_6 + Li_{1-x}CoO_2 \quad (3)$$

When the positive electrode 120 and the negative electrode 130 of a charged battery are electrically connected via electrical connector 1190 and load 1180, the lithium battery ion spontaneously discharges. During discharge, graphitic carbon at the negative electrode 130 is oxidized as $Li^+$ ions are deintercalated from the negative electrode material layers, and conducted through the liquid electrolyte to the positive electrode material, where they are intercalated. Electrons generated at the negative electrode material flow from the negative electrode 130 to the positive electrode 120, powering load 1180. During discharge, positive electrode material is reduced. The discharge positive electrode, negative electrode, and overall electrochemical reactions are represented by the reverse reactions of equations (1), (2), and (3), respectively.

The lithium ion battery may also comprise a solid electrolyte interface (SEI) (not shown in FIG. 11) between the negative electrode material and the liquid electrolyte. The SEI is permeable to lithium ions but not to the liquid electrolyte, and thereby protects the intercalated lithium ions in the negative electrode material from reacting with the liquid electrolyte. During the initial charge of the battery a permanent passivation layer of SEI may be formed at the interface between the negative electrode and the liquid electrolyte. Accordingly, the liquid electrolyte is in fluid contact with the SEI, the positive electrode material, and the neutral metal can.

The geometry of the lithium ion battery cells may be cylindrical, prismatic, pseudo-prismatic, and the like, as are known in the art.

Turning now to FIG. 2, it illustrates an example of a lithium ion battery 200 having a reference electrode 220 electroplated on the interior surface of the neutral metal can 108, and FIG. 3 illustrates an example apparatus 300 for manufacturing the reference electrode 220. As shown in FIGS. 1-3 and 11, the reference electrode 220 may coat a portion of the interior surface of the neutral metal can 108, however, in some embodiments, the reference electrode 220 may uniformly coat the interior surface of the neutral metal can.

Apparatus 300 for electroplating reference electrode 220 on the interior surface 111 of the neutral metal can includes a resistor 330 connecting the negative electrode 130 to the neutral metal can 110. A voltage monitor device 350 is connected to either end of resistor 330 to measure the voltage drop across resistor 330.

To manufacture the reference electrode, the lithium ion battery may be charged to a threshold state-of-charge (SOC). The threshold SOC may be predetermined according to the total battery capacity, the mass of the reference electrode to be formed, and the like. In one example, the threshold SOC may comprise 20% of the total battery charge capacity. Charging the battery to the threshold SOC may aid in ensuring that the neutral metal can potential is greater than the potential of the lithiated negative electrode. After charging the battery to the threshold SOC, resistor 330 may be connected between the negative electrode 130 and the neutral metal can 110. The neutral metal can has a higher potential than the negative electrode. Accordingly, current will flow from the negative electrode through resistor 330 to the neutral metal can, and lithium ions will flow from the negative electrode material inside the battery through the liquid electrolyte to the interior surface 111 of the neutral metal can, where the lithium ions will be reduced, plating the interior surface 111 of the neutral metal can.

The rate of electroplating the reference electrode may be increased or decreased by reducing or increasing, respectively, the resistance of resistor 330. Furthermore, the amount of lithium plated on the interior surface 111 of the neutral metal can 108 may be determined by the total electroplating time and the current passing through the resistor. In one example, less than 1 percent of the total cell capacity of lithium is deposited on the interior surface 111 to form the reference electrode. As such, formation of the reference electrode has a negligible impact on the total lithium ion battery capacity.

The portion of the interior surface 111 that contacts the electrolyte may be plated with lithium to form a reference electrode. In one example, the electrolyte volume does not fill the cell can. As such the interior surface 111 of the cell can is partially plated.

In one example of forming a reference electrode, a 5 ampere-hour (A-h) lithium ion battery may be charged to 4.1 volts, and subsequently, a 10 ohm resistor may be connected to the neutral aluminum can and the negative electrode, whereby 30 mA-h of lithium may be deposited on the interior surface of the neutral aluminum can. Electroplating lithium metal on the interior surface 111 may be performed on the bare interior surface 111 of neutral metal can 108. Electroplating of the lithium reference electrode may be performed without pretreatment or precoating of the interior surface 111. Furthermore, formation of the reference electrode in this manner may be performed with an existing sealed lithium ion battery without breaching the seal, and/or adding additional ports. Further still, the reference electrode may form a lithium reference electrode or a lithium-aluminum alloy reference electrode.

FIGS. 4 and 5 compare the open circuit voltage between the neutral aluminum can and the negative electrode with time, for the case of a neutral aluminum can and the neutral aluminum can with the plated lithium on its interior surface, respectively. As shown in chart 400 of FIG. 4, the open circuit voltage 440 of the neutral aluminum can (without plated lithium on interior surface) is unstable, decreasing greater than 1 mV over 2 h, due to polarization at the electrode. In comparison, as shown in chart 500 of FIG. 5, the open circuit voltage 520 of the neutral aluminum can with the plated lithium on its interior surface as the reference electrode exhibits a much more stable signal, changing less than 1 mV over an entire day. Accordingly, the neutral aluminum can with the electroplated lithium on its interior surface is near non-polarizable relative to the bare neutral aluminum can.

Turning now to FIGS. 6-8, they illustrate another example comparing a cell with a lithium reference electrode plated on the interior surface of a neutral aluminum can with a pure aluminum can as a reference electrode of a lithium ion battery. An ideal reference electrode should be reversible and reproducible. Because all potential detection systems are operated by current, a certain amount of current, even though very small, must be passed through the reference electrode. In this example, the neutral aluminum can cell had a charge capacity of 5 A-h, and the cell was charged to 4.1V. A 10 ohm resistor was utilized to electrically connect the negative electrode and the neutral aluminum can, wherein a shorting period was selected to form an amorphous lithium-aluminum alloy electroplated coating on the interior surface of the neutral aluminum can. During electroplating of the reference electrode, the measured potential difference across the resistor was approximately 10 mV, wherein the voltage of the neutral aluminum can was higher than the voltage of the negative electrode.

An EC-lab potential system was used to monitor the cross-resistor voltage and to calculate the plating lithium capacity. After the shorting period, the total lithium plating capacity was 50 mA-h, the potential of the can relative to the negative electrode was changed from 2.27 V to 0.25 V, and 50 mA-h capacity of lithium was plated on the interior can surface. After formation of the reference electrode, the potential of the cell can relative to the negative electrode drifted 1 mV over 20 h.

Then the above-described lithium ion battery cell with the electroplated reference electrode was charged to 50% SOC. A second 5 A-h lithium ion battery cell having no lithium reference electrode electroplated on the interior surface of the cell can, but equivalent in all other aspects, was also charged to 50% SOC. Both charged cells were subjected to an input current signal 610 profile as shown by chart 600 of FIG. 6, including 10 μA and 1 μA positive and negative current pulses passed through the positive electrode and the cell can, for determining the polarization property of each cell can. Because the pulse current period is short and the pulse current density is small, it is assumed that the positive electrodes are not altered during the experiment.

FIG. 7 illustrates a chart 700 of the potential difference 710 between the positive electrode and the non-lithium plated can (e.g., an aluminum can reference electrode). The large magnitude changes, and the hysteresis and irreversibility of the potential difference 710 in response to the positive and negative 10 μA pulses and the positive and negative 1 μA pulses indicate the polarizability of the aluminum can reference electrode. Polarization of the reference electrode can result from formation of a charge double layer at the interface between the surface of the electrode and the liquid electrolyte, influencing conduction of lithium ions near the electrode surface. As such, the aluminum can is not suitable for use as a reference electrode.

In contrast, FIG. 8 illustrates a chart 800 showing the potential difference 810 between the positive electrode and the reference electrode comprising the plated lithium metal on the interior surface of the can in response to the input current signal 610. Changes to the potential difference 810 are very small relative to the changes in potential difference 710 in response to the input current signal 610. Furthermore, in response to the positive and negative input current pulses, potential difference 810 exhibits a response that is reversible and no observable hysteresis. Accordingly, the surface overpotential and concentration overpotential are very small, and the lithium plated aluminum reference electrode can be used as a reference electrode to measure the potential change of individual electrodes for monitoring SOH and/or SOC of the lithium ion battery.

In this manner, a lithium ion battery may comprise a neutral metal can, and a reference electrode electroplated on an interior surface of the neutral metal can. The reference electrode may comprise lithium, wherein the lithium comprises less than 1 weight percent of a battery lithium content. Furthermore, the reference electrode may consist essentially of lithium aluminum alloy. Further still, the neutral metal can may comprise a neutral aluminum can. Further still, the neutral metal can may comprise one of a neutral stainless steel can, and a neutral nickel plate steel can. Further still, the reference electrode may comprise a non-polarizable reference electrode.

Turning now to FIG. 9, it illustrates a flow chart of an example method 900 of manufacturing a reference electrode for a lithium ion battery. The lithium ion battery may be an existing sealed two-electrode battery. Furthermore, the lithium ion battery may comprise a positive electrode, a negative electrode, and a neutral metal can.

Method 900 may begin at 910 where an existing or new lithium ion battery is charged to a threshold state-of-charge, $SOC_{TH}$. As an example, $SOC_{TH}$ may comprise 20% of the battery capacity. In other examples, $SOC_{TH}$ may comprise a predetermined SOC that is high enough for electroplating a lithium reference electrode on to the interior surface of the can. As shown in FIGS. 12-13, in one example, a power source may be electrically connected to the neutral metal can and the negative electrode or the positive electrode of the lithium ion battery for charging the lithium ion battery to the threshold SOC.

At 920, method 900 determines if the current to the can is to be moderated during formation of the reference electrode. If current is to be moderated, at 924 the neutral metal can is electrically connected to the negative electrode with a resistor. In the case where the resistor resistance is relatively high, the current will be more heavily moderated. In the case where the resistor resistance is relatively low, the current will be more lightly moderated. Moderating the current may aid in controlling the rate of formation (e.g., the rate of electroplating) of the reference electrode on the interior surface of the can, thereby reducing the risk of consuming a large quantity of lithium, which may reduce the battery capacity. Moderating the rate of electroplating may aid in forming a reference electrode with a homogeneous morphology.

Returning to 920, if the current is not to be moderated method 900 continues at 928 where the neutral metal can is electrically connected to the negative electrode without a resistor. Electrically connecting the neutral metal can to the negative electrode without a resistor may aid in achieving a higher rate of electroplating, reducing a time for manufacturing the reference electrode.

Method 900 continues at 940 where the lithium reference electrode is electroplated on the interior surface of the can. In one embodiment, the reference electrode is plated on the interior surface of the can only after the lithium ion battery is charged to the threshold state-of-charge. Plating the reference electrode only after the lithium ion battery is charged to $SOC_{TH}$ may help to ensure that the reference electrode is adequately formed. As previously described, the lithium may be plated directly on the bare, untreated interior surface of the neutral metal can. The neutral metal can may comprise aluminum, stainless steel, or nickel-plated steel. Furthermore, the electroplating may be performed without breaching the seal of the lithium ion battery.

At 960, method 900 may monitor the potential difference between the negative electrode and the neutral metal can. As an example, an apparatus 300 (e.g., with or without the resistor 330) may be used to monitor the potential difference between the negative electrode and the neutral metal can. Monitoring the potential difference between the negative electrode and the neutral metal can may allow for determining and controlling the plating lithium capacity (e.g., the mass of lithium plated) of the reference electrode.

In this manner, a method of manufacturing a reference electrode for a lithium ion battery may comprise charging the battery to a threshold state-of-charge, wherein the battery includes a neutral metal can and a negative electrode, and plating a reference electrode on an interior surface of the neutral metal can by electrically connecting the neutral metal can to the negative electrode, a neutral metal can potential being greater than a negative electrode potential. The method may further comprise monitoring a voltage between the neutral metal can and the negative electrode while plating the reference electrode to determine a plating capacity. Furthermore, a two-electrode lithium-ion battery is charged to the threshold state-of-charge, wherein the two-electrode lithium ion battery comprises a neutral aluminum can. Further still, the interior surface of the neutral aluminum can comprises bare, untreated aluminum.

Furthermore, the reference electrode may be plated on the interior surface of the neutral metal can only after the battery is charged to the threshold state-of-charge. Further still, charging the battery to the threshold state-of-charge comprises charging the lithium ion battery to 20% of a sealed battery charge capacity. Further still, the neutral metal can may comprise a sealed neutral metal can, wherein manufacturing the reference electrode is performed without breaching the sealed neutral metal can. Further still, less than 1 weight percent of a battery lithium content may be plated on the interior surface of the neutral metal can.

Turning now to FIG. 12, it illustrates another example embodiment of an apparatus 1200 for manufacturing a reference electrode for a lithium ion battery. Apparatus 1200 includes a power source 1210 electrically connected to a lithiated negative electrode 130 and the neutral metal can 110. In one example, power source 1210 may be a direct current power source.

To manufacture the reference electrode, the electrical power source may direct current from the lithitated negative electrode to the neutral metal can. Accordingly, lithium ions will flow from the negative electrode material inside the battery through the liquid electrolyte to the interior surface 111 of the neutral metal can, where the lithium ions will be reduced, plating the neutral metal can. As shown in FIG. 12, a voltage monitor 350 may be used to monitor the voltage drop across the power source 1210 in order to determine the rate of electroplating.

Turning now to FIG. 13, it illustrates another example embodiment of an apparatus 1300 for manufacturing a reference electrode for a lithium ion battery. Apparatus 1300 includes a power source 1210 electrically connected to the positive electrode 120 and the neutral metal can 110.

To manufacture the reference electrode, the electrical power source 1210 may direct current from the positive electrode to the neutral metal can, causing lithium ions to flow from the positive electrode material inside the battery through the liquid electrolyte to the interior surface 111 of the neutral metal can. At the interior surface 111 of the neutral metal can, the lithium ions will be reduced, thereby plating the neutral metal can. As shown in FIG. 13, a voltage monitor 350 may be used to monitor the voltage drop across the power source 1210 in order to determine the rate of electroplating.

Turning now to FIG. 14, it illustrates a flow chart for another example method 1400 of manufacturing a reference electrode for a lithium ion battery. Method 1400 begins at 1410 where an electrical power source is electrically connected to a neutral metal can and an electrode of a lithium ion battery. In one example, the electrode may be a lithiated negative electrode, and in another example, the electrode may be a positive electrode of the lithium ion battery. At 1420, the electrical power source may direct current to the neutral metal can so that at 1430, lithium is plated on the bare interior surface of the can without breaching the sealed battery. As described above, lithium ions in the liquid electrolyte may be electrochemically reduced and plated on to the interior surface of the can at 1430. Next, at 1440, the voltage difference between the neutral metal can and the negative electrode may be monitored by a voltage monitoring device in order to determine the amount of lithium plated on the interior surface of the neutral metal can.

In this manner, a method of manufacturing a reference electrode for a lithium ion battery may comprise electrically connecting an electrical power source to a neutral metal can and an electrode of the lithium ion battery, and plating a reference electrode on an interior surface of the neutral metal can by directing current to the neutral metal can with the electrical power source. The electrical power source may be electrically connected to the neutral metal can and a lithiated negative electrode of the lithium ion battery. In another example, the electrical power source may be electrically connected to the neutral metal can and a positive electrode of the lithium ion battery. Furthermore, the reference electrode may comprise lithium plated directly on a bare interior surface of the neutral metal can.

Turning now to FIG. 10, it illustrates an example of a vehicle propulsion system 1000. Vehicle propulsion system 1000 may comprise a fuel burning engine 110 and a motor 120. As a non-limiting example, engine 110 comprises an internal combustion engine and motor 120 comprises an electric motor. As such, vehicle propulsion system 1000 may be a propulsion system for a hybrid-electric vehicle. However, vehicle propulsion system may also be a propulsion system for a non-hybrid vehicle, or an electric vehicle with an electric motor and no combustion engine. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 1000 may be referred to as a hybrid electric vehicle (HEV). In other examples, where the vehicle propulsion system 1000 is for an electric vehicle, vehicle propulsion system may be referred to as an electric vehicle (EV).

Vehicle propulsion system 1000 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge an energy storage device such as a battery management system (BMS) 1010. For example, motor 120 may receive wheel torque from drive wheel 130 as indicated by arrow 122 where the motor may convert the kinetic energy of the vehicle to electrical energy for storage at BMS 1010 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at BMS 1010 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 1000 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or BMS 1010 as indicated by arrow 162. As another example, engine 110 may be operated to drive motor 120 which may in turn provide a generator function to convert the engine output to electrical energy, where the electrical energy may be stored at BMS 1010 for later use by the motor. The vehicle propulsion system may be configured to transition between two or more of the operating modes described above depending on vehicle operating conditions. As another example, vehicle propulsion system may be a propulsion system for an electric vehicle (e.g., with no combustion engine), wherein an electric motor receiving electric power from BMS 1010 (e.g., a battery) may propel the vehicle.

BMS 1010 may include a plurality of battery cells 1056 connected in series and/or in parallel for supplying energy to the vehicle propulsion system 1000. Each of the plurality of battery cells 1056 may comprise a positive electrode, negative electrode, and a reference electrode electroplated directly to an interior surface of the neutral battery can. The reference electrode is not shown in FIG. 10, but may be a reference electrode 220 electroplated to the interior surface of the neutral metal can as shown in FIG. 2. BMS 1010 may further comprise a battery controller 1016 which may be connected to battery pack terminals 1020, 1022, including being connected to the reference electrodes of the cells, and receive signals from the battery pack indicating the state-of-health (SOH) and/or state-of-charge (SOC) of the battery pack. Being connected to the reference electrodes of the cells may aid the BMS in monitoring the cells' state of charge and distinguish changes in the cells' negative electrodes and positive electrodes (e.g., changes in electrode potential). Furthermore, battery controller 1016 may receive signals from the battery pack indicating overall SOH and/or SOC or individual SOH and/or SOC of each battery cell 1056 of the battery pack 1050. Battery controller 1016 may also communicate with control system 190. In another example, control system 190 may comprise battery controller 1016.

Fuel system 140 may include one or more fuel tanks 144 for storing fuel on-board the vehicle. For example, fuel tank 144 may store one or more liquid fuels, including but not limited to gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge BMS 1010 via motor 120 or generator 160.

In some embodiments, BMS 1010 may be configured to store electrical energy that may be supplied to other electrical loads residing on-board the vehicle (other than the motor), including cabin heating and air conditioning, engine starting, headlights, cabin audio and video systems, an exhaust-gas grid heater, an exhaust-gas recycle cooler, etc. As a non-limiting example, BMS 1010 may include one or more batteries and/or capacitors.

Control system 190 may communicate with one or more of engine 110, motor 120, fuel system 140, BMS 1010, and generator 160. As will be described in FIG. 2, control system 190 may comprise controller 211 and may receive sensory feedback information from one or more of engine 110, motor 120, fuel system 140, BMS 1010, and generator 160. Further, control system 190 may send control signals to one or more of engine 110, motor 120, fuel system 140, BMS 1010, and generator 160 responsive to this sensory feedback. Control system 190 may receive an indication of an operator requested output of the vehicle propulsion system from a Vehicle Operator 102. For example, control system 190 may receive sensory feedback from pedal position sensor 194 which communicates with pedal 192. Pedal 192 may refer schematically to a brake pedal and/or an accelerator pedal.

BMS 1010 may periodically receive electrical energy from a power source 180 residing external to the vehicle (e.g. not part of the vehicle) as indicated by arrow 184. As a non-limiting example, vehicle propulsion system 1000 may be configured as a plug-in hybrid electric vehicle (HEV), whereby electrical energy may be supplied to BMS 1010 from power source 180 via an electrical energy transmission cable 182. As a further non-limiting example, vehicle propulsion system 1000 may be configured as a plug-in electric vehicle (EV), whereby electrical energy may be supplied to BMS 1010 from power source 180 via an electrical energy transmission cable 182. Control system 190 may further control the output of energy or power from BMS 1010 (e.g., a battery) depending on the electric load of vehicle propulsion system 1000. For example, during reduced electrical load operation, control system 190 may step-down the voltage delivered from BMS 1010, via a an inverter/converter, in order to save energy.

During a recharging operation of BMS 1010 from power source 180, electrical transmission cable 182 may electrically couple BMS 1010 and power source 180. While the vehicle propulsion system is operated to propel the vehicle, electrical transmission cable 182 may be disconnected between power source 180 and BMS 1010. Control system 190 may identify and/or control the amount of electrical energy stored at the BMS, which may be referred to as the state of charge (state-of-charge).

In other examples, electrical transmission cable 182 may be omitted, where electrical energy may be received wirelessly at BMS 1010 from power source 180. For example, BMS 1010 may receive electrical energy from power source 180 via one or more of electromagnetic induction, radio waves, and electromagnetic resonance. As such, it will be appreciated that any suitable approach may be used for recharging BMS 1010 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 1000 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

A plug-in hybrid electric vehicle, as described with reference to vehicle propulsion system 1000, may be configured to utilize a secondary form of energy (e.g. electrical energy) that is periodically received from an energy source that is not otherwise part of the vehicle.

The vehicle propulsion system 1000 may also include a message center 196, ambient temperature/humidity sensor 198, electrical load sensor 154, and a roll stability control sensor, such as a lateral and/or longitudinal and/or steering wheel position or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, GPS device, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199. Furthermore, controller 190 may also display messages to alert a vehicle operator 102 when a battery SOH falls below a threshold SOH or when a battery SOC falls below a threshold SOC.

In this manner, a vehicle battery management system, may comprise a lithium ion battery including a neutral metal can and a reference electrode electroplated on an interior surface of the neutral metal can, and a controller with executable instructions to determine a state-of-health of a battery by measuring a potential difference between the reference electrode and a negative electrode, and measuring a potential difference between the reference electrode and a negative electrode. Furthermore, the state-of-health of the battery may be determined after a threshold period of time. The controller may further comprise executable instructions to monitor a state-of-charge of the battery by measuring a potential difference between the reference electrode and a negative electrode, and measuring a potential difference between the reference electrode and a negative electrode. Furthermore, the state-of-health of the battery may be determined in the absence of further sensors internal to the battery.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of manufacturing a reference electrode for a lithium ion battery, comprising:
   charging the battery to a threshold state-of-charge, wherein the battery includes a neutral metal can and a negative electrode; and
   plating the reference electrode on an interior surface of the neutral metal can by electrically connecting the neutral metal can to the negative electrode, a neutral metal can potential being greater than a negative electrode potential.

2. The method of claim 1, further comprising monitoring a voltage between the neutral metal can and the negative electrode while plating the reference electrode to determine a plating capacity.

3. The method of claim 1, wherein a two-electrode lithium-ion battery is charged to the threshold state-of-charge, wherein the neutral metal can potential is greater than the negative electrode potential.

4. The method of claim 3, wherein the two-electrode lithium-ion battery comprises a neutral aluminum can.

5. The method of claim 4, wherein an interior surface of the neutral aluminum can comprises bare, untreated aluminum.

6. The method of claim 1, wherein the reference electrode is plated on the interior surface of the neutral metal can only after the battery is charged to the threshold state-of-charge.

7. The method of claim 1, wherein charging the battery to the threshold state-of-charge comprises charging the lithium ion battery to 20% of a sealed battery charge capacity.

8. The method of claim 1, wherein the neutral metal can comprises a sealed neutral metal can, and wherein manufacturing the reference electrode is performed without breaching the sealed neutral metal can.

9. The method of claim 1, wherein less than 1 weight percent of a battery lithium content is plated on the interior surface of the neutral metal can.

10. A method of manufacturing a reference electrode for a lithium ion battery, comprising:
    electrically connecting an electrical power source to a neutral metal can and an electrode of the lithium ion battery; and
    plating the reference electrode on an interior surface of the neutral metal can by directing current to the neutral metal can with the electrical power source.

11. The method of claim 10, wherein the electrical power source is electrically connected to the neutral metal can and a lithiated negative electrode of the lithium ion battery.

12. The method of claim 10, wherein the electrical power source is electrically connected to the neutral metal can and a positive electrode of the lithium ion battery.

13. The method of claim 10, wherein the reference electrode comprises lithium plated directly on a bare interior surface of the neutral metal can.

* * * * *